(12) United States Patent
Lee et al.

(10) Patent No.: US 10,244,882 B2
(45) Date of Patent: Apr. 2, 2019

(54) COOKING VESSEL AND METHOD FOR MANUFACTURING THE SAME

(71) Applicants: KIMS HOLDINGS CO., LTD., Gimhae-si, Gyeongsangnam-do (KR); Heonho Lee, Ansan-si, Gyeonggi-do (KR)

(72) Inventors: Heonho Lee, Ansan-si (KR); Jongmoon Kim, Busan (KR)

(73) Assignee: KIMS HOLDING CO., LTD. (KR)

( * ) Notice: Subject to any disclaimer, the term of this patent is extended or adjusted under 35 U.S.C. 154(b) by 229 days.

(21) Appl. No.: 14/284,830

(22) Filed: May 22, 2014

(65) Prior Publication Data

US 2015/0157160 A1    Jun. 11, 2015

Related U.S. Application Data

(63) Continuation of application No. PCT/KR2014/000693, filed on Jan. 24, 2014.

(30) Foreign Application Priority Data

Dec. 6, 2013  (KR) ........................ 10-2013-0151091

(51) Int. Cl.
 *A47J 27/00* (2006.01)
 *B05D 3/06* (2006.01)
 *A47J 36/02* (2006.01)
 *B05D 5/08* (2006.01)

(52) U.S. Cl.
 CPC .......... *A47J 27/002* (2013.01); *A47J 36/025* (2013.01); *B05D 3/067* (2013.01); *B05D 5/08* (2013.01)

(58) Field of Classification Search
None
See application file for complete search history.

(56) References Cited

U.S. PATENT DOCUMENTS

| 4,400,252 | A | * | 8/1983 | Ushijima | ................. B44C 1/04 |
|||||| 101/470 |
| 2008/0105689 | A1 | * | 5/2008 | Ren | ....................... A47J 27/002 |
|||||| 220/573.2 |
| 2012/0118168 | A1 | * | 5/2012 | Park | ....................... A47J 36/025 |
|||||| 99/324 |
| 2014/0004311 | A1 | * | 1/2014 | Alim | ....................... B32B 3/28 |
|||||| 428/172 |

FOREIGN PATENT DOCUMENTS

| CN | 202775794 | * | 3/2013 | ............. A47J 27/00 |
| JP | WO 2005014745 A1 | * | 2/2005 | ............. C08L 63/00 |

OTHER PUBLICATIONS

Lin et al. "Fast patterning microstructures using inkjet printing conformal masks" Microsyst Technol (2008) 14:1263-1267.*

(Continued)

*Primary Examiner* — Robert S Walters, Jr.
(74) *Attorney, Agent, or Firm* — Park & Associates IP Law, P. C.

(57) ABSTRACT

The present invention relates to a cooking vessel and a method for manufacturing the same wherein a plurality of concave and convex portions is protrudingly formed to a shape of a dotted line, not to a shape of a solid line, on the bottom surface of the cooking vessel, thus maximizing a non-stick effect to prevent food from sticking to the bottom surface of the cooking vessel.

3 Claims, 5 Drawing Sheets

(56) References Cited

OTHER PUBLICATIONS

Qin et al. "Rapid Prototyping of Complex Structures with Feature Sizes Larger Than 20 um" Adv. Mater. 1996, 8, No. 11 pp. 917-919.*
Deng et al. "Prototyping of Masks, Masters, and Stamps/Molds for Soft Lithography Using an Office Printer and Photographic Reduction" Anal. Chem. 2000, 72, 3176-3180.*
LuLin et al. "An inkjet printing soft photomask and its application on organic polymer substrates" Science China Chemistry Aug. 2010, vol. 53, Issue 8, pp. 1695-1704.*
English translation of the abstract for CN202775794.*

* cited by examiner

COOKING VESSEL AND METHOD FOR MANUFACTURING THE SAME

REFERENCE TO RELATED APPLICATIONS

This is a continuation of pending International Patent Application PCT/KR2014/000693 filed on Jan. 24, 2014, which designates the United States and claims priority of Korean Patent Application No. 10-2013-0151091 filed on Dec. 6, 2013, the entire contents of which are incorporated herein by reference.

FIELD OF THE INVENTION

The present invention relates to a cooking vessel and a method for manufacturing the same wherein a plurality of concave and convex portions is formed on the bottom surface of the cooking vessel and a coating layer is formed on the concave portions, and more particularly, to a cooking vessel and a method for manufacturing the same wherein a plurality of concave and convex portions is protrudingly formed to a shape of a dotted line, not to a shape of a solid line, on the bottom surface of the cooking vessel, thus maximizing a non-stick effect to prevent food from sticking to the bottom surface of the cooking vessel.

BACKGROUND OF THE INVENTION

As well known, all kinds of cooking vessels are used to cook food in many places like houses, restaurants and so on. While the cooking vessel such as a pot, frying pan, etc. is being used, however, food frequently sticks to the bottom surface of the cooking vessel to cause the cooking state to be not clean, and further, due to the chemical features of various seasoning added upon cooking, harmful chemical reactants may be produced to cause the erosion of the cooking vessel.

So as to solve the above-mentioned problems, accordingly, there have been proposed a variety of products each having a film layer formed on the bottom surface thereof to provide a non-stick function. At this time, the non-stick function can be obtained by applying the film layer made of a coating material such as Teflon or ceramic to the surface of the cooking vessel to prevent food from sticking to the surface of the cooking vessel.

One example of conventional cooking vessels having the non-stick function is disclosed in Korean Utility Model Publication No. 20-1994-0003569 (hereinafter referred simply to as 'patent document 1'), wherein a ceramic layer and a Teflon layer are sequentially coated on the inner bottom surface of the cooking vessel, thereby increasing the separation of the surface of the cooking vessel from food during cooking, improving erosion resistance, and keeping good bonding state of the Teflon layer.

According to the patent document 1, however, the ceramic layer and the Teflon layer are laminated just on the inner surface of the raw material, so that if an external impact or a given temperature is applied to them, they may be easily peeled off and damaged. That is, the non-stick effect disappears at the portion of the film layer on which the ceramic layer and the Teflon layer are damaged, and further, the damaged film layer is mixed with the food during cooking to give a negative effect to the human body.

So as to solve the problems generated in the patent document 1, on the other hand, there has been suggested Korean Patent No. 10-0804387 (hereinafter referred simply to as 'patent document 2'), wherein a plurality of concave and convex portions is formed on the bottom surface of the cooking vessel and a coating layer is formed on the concave portions so as to prevent food from sticking to the bottom surface of the cooking vessel.

However, the patent document 2 has the following problems.

Firstly, the formation of the plurality of concave and convex portions on the bottom surface of the cooking vessel is conducted by means of silk screen printing, so that ink smearing seriously occurs according to the degree of the concentration or temperature of ink, thereby failing to achieve the concave and convex portions having uniform heights.

Secondly, so as to form the concave and convex portions on the bottom surface of the cooking vessel, a stainless steel plate is fixed below a silk screen film on which holes are formed, while having a given space from the silk screen film, and next, ink is applied to the silk screen film and pushed to the holes of the silk screen film by means of rubber or brush, thereby conducting printing on the stainless steel plate, so that ink smearing may occur in accordance with the degree of skill of a worker, the whole printing work may be unstably conducted, and when relatively large area is printed, constant printing quality cannot be maintained on the starting and finishing portions of the area.

Thirdly, relatively large working space is needed, it is hard to conduct precise work, and specifically, a number of defective products are made.

Fourthly, a beehive (hexagonal) pattern is formed on the bottom surface of the cooking vessel, and in this case, the beehive pattern is formed by a solid line, so that if the width of the solid line is 0.5 mm and the length of one surface of the hexagon is 5 mm, the non-stick effect can be obtained through the width of the solid line but can be lost in the lengthwise direction of the solid line, thereby causing food to stick to the bottom surface of the cooking vessel.

Lastly, when oil pours on the bottom surface of the cooking vessel, it gathers inside the hexagon, so that the oil is not distributed evenly to cause food to stick to the bottom surface of the cooking vessel, thereby making it hard to cook.

SUMMARY OF THE INVENTION

Accordingly, the present invention has been made in view of the above-mentioned problems occurring in the prior art, and it is an object of the present invention to provide a cooking vessel and a method for manufacturing the same wherein a plurality of concave and convex portions is protrudingly formed to a shape of a dotted line, not to a shape of a solid line, on the bottom surface of the cooking vessel, thus maximizing a non-stick effect to prevent food from sticking to the bottom surface of the cooking vessel.

To accomplish the above object, according to the present invention, there is a method for manufacturing a cooking vessel, the method including the steps of: applying photosensitive paint to the surface of a stainless steel plate to form a paint layer; applying a film to the surface of the paint layer, the film having black portions and transparent portions patterned thereon; irradiating the film with ultraviolet rays to allow the portions of the paint layer disposed underneath the transparent portions to be cured and to allow the portions of the paint layer disposed underneath the black portions are not cured; immersing the layered stainless steel plate, after the paint layer is cured, in a compound to separate or detach the uncured paint layer disposed underneath the black portions from the stainless steel plate, and thereby to form a plurality of concave and convex portions in the stainless steel olate; and applying coating liquid for providing a non-stick function to the surface of the stainless steel plate to form coating layers on the concave and convex portions, and thereafter removing the coating layer from the convex portions.

DETAILED DESCRIPTION OF THE INVENTION

The present invention relates to a cooking vessel having a plurality of concave and convex portions formed on the bottom surface thereof, wherein the plurality of convex portions is formed of a plurality of protruding dots spaced apart from each other by a given distance.

Hereinafter, an explanation on a cooking vessel and a method for manufacturing the same according to a preferred embodiment of the present invention will be in detail given with reference to the attached drawings. In the detailed description, hereinafter, one preferred embodiment of the present invention will be suggested so as to achieve the above-mentioned technical solution, and other embodiments of the present invention will be explained through the description of the present invention.

When a plurality of concave and convex portions is formed on the inner bottom surface of a cooking vessel according to the present invention, the concave and convex portions are protrudingly formed not to a shape of a solid line in the conventional practice, but to a shape of a dotted line, thus maximizing a non-stick effect to prevent food from sticking to the bottom surface of the cooking vessel.

Specifically, when the plurality of concave and convex portions is formed on the inner bottom surface of the cooking vessel according to the present invention, they are formed to a shape of a hexagon like a beehive. As appreciated from Table 1, that is, the hexagonal shape is protrudingly formed not to a shape of a solid line in the conventional practice, but to a shape of a dotted line, thus obtaining a higher non-stick effect than the conventional cooking vessels (for example, patent document 2) to prevent food from sticking to the bottom surface of the cooking vessel.

The hexagonal shape like the beehive is formed by protruding dots, and therefore, if oil is applied to the bottom surface of the cooking vessel, it flows into the spaces between the neighboring dots and evenly spreads, which prevents food from sticking to the bottom surface of the cooking vessel.

For example, if each dot formed on the bottom surface of the cooking vessel has a diameter of 0.5 mm, the diameter of 0.5 mm is maintained in every direction, and even though each dot has the diameter of 0.5 mm, the dots are spaced apart from each other, thus increasing the non-stick effect.

Hereinafter, the preferred embodiment of the present invention will be in detail described.

Referring to FIGS. 1A to 1G, a method for manufacturing a cooking vessel according to the present invention will be in detail explained. According to the present invention, the method for manufacturing a cooking vessel includes steps a through h as will be described below.

Figure 1A:
FIGS. 1A to 1G are flowcharts showing the processes for manufacturing a cooking vessel according to the present invention.

As shown in FIG. 1A, a stainless steel plate 10 is prepared (at step a).

Figure 1B:
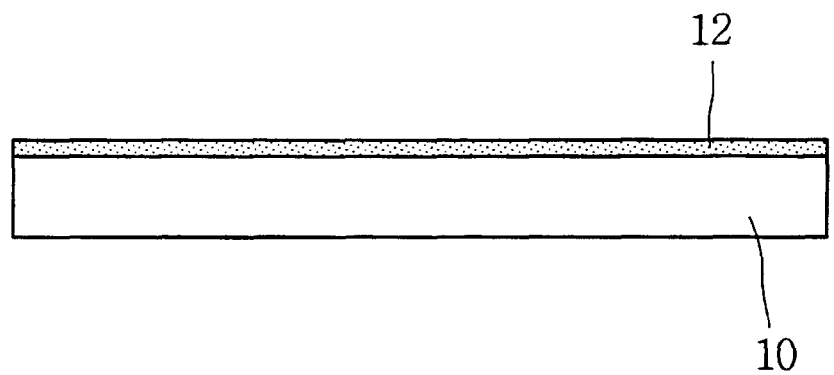

As shown in FIG. 1B, photosensitive paint responding to ultraviolet rays is sprayed to the surface of the stainless steel plate 10 to form a paint layer 12 (at step b).

Figure 1C:
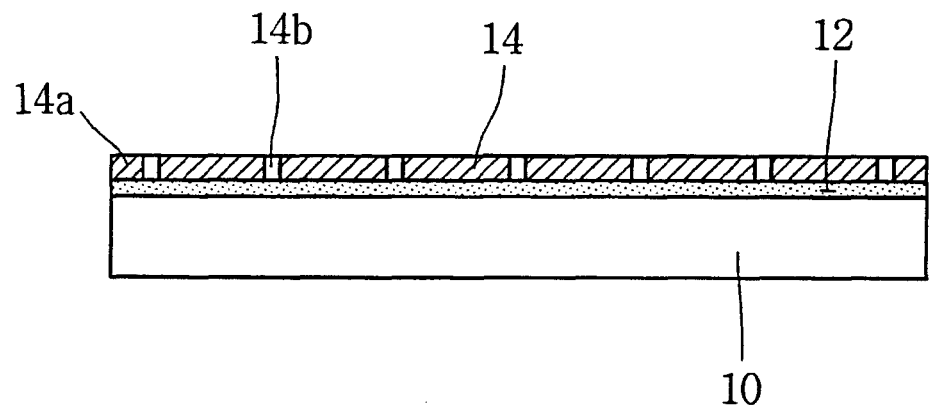

As shown in FIG. 1C, a film 14 is applied to the surface of the stainless steel plate 10 on which the paint layer 12 is formed (at step c). At this time, the application of the film 14 to the paint layer 12 is desirably conducted in a closed place where light does not enter.

Figure 2:
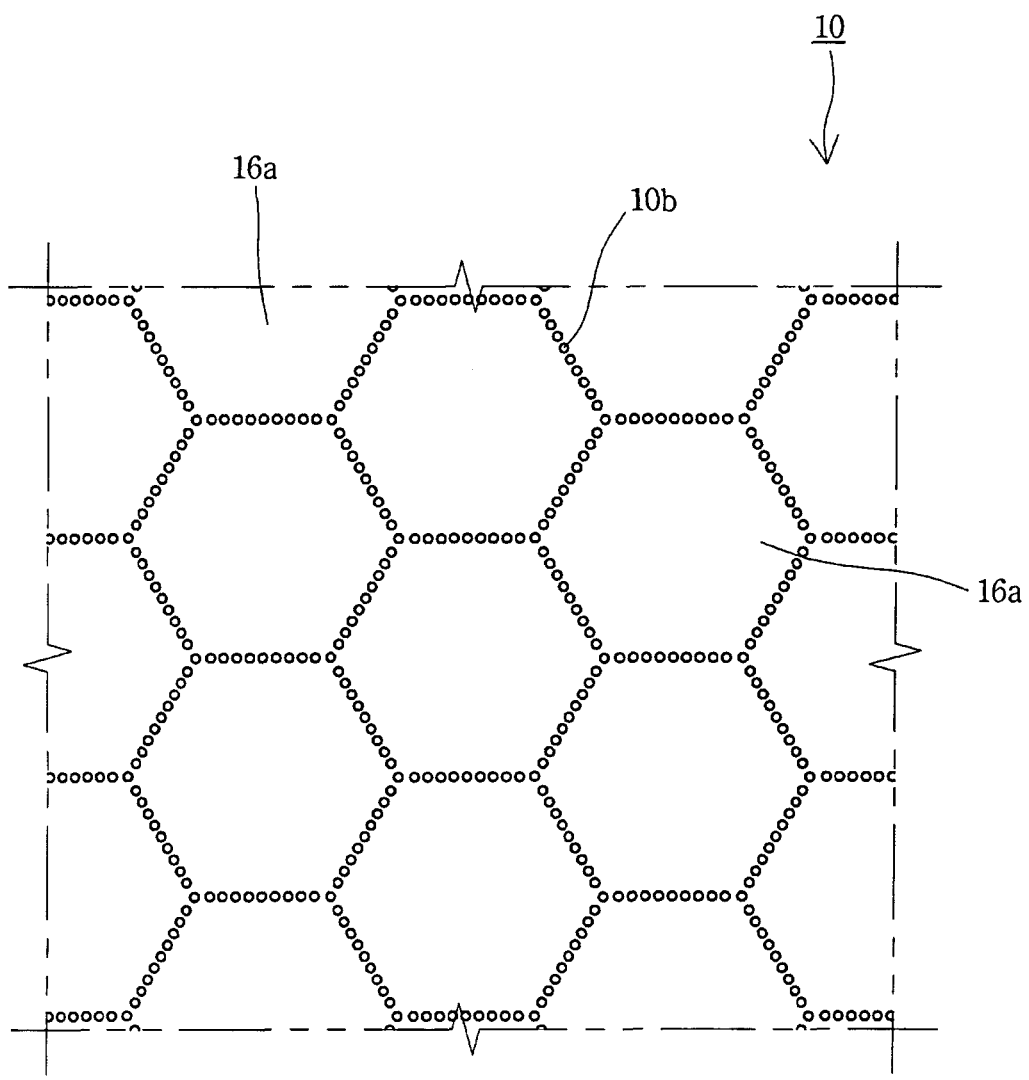
FIG. 2 is a plan view showing the film of FIG. 1C.
Figure 3:
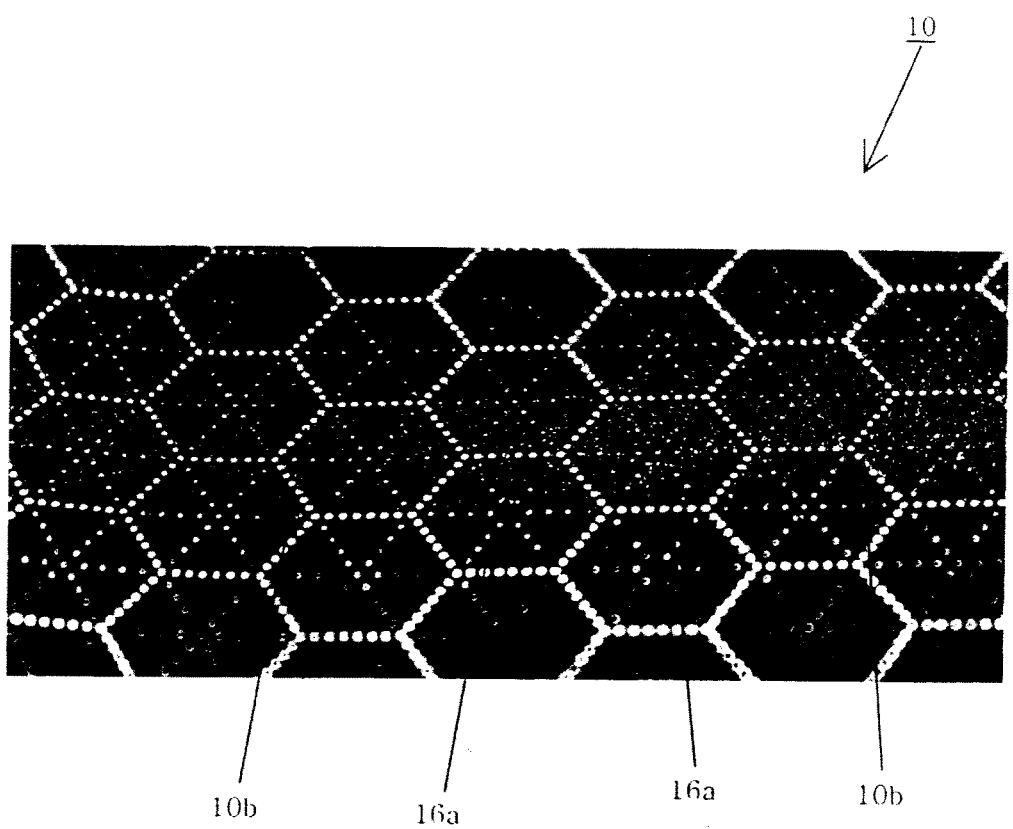
FIG. 3 shows the inner bottom surface of the cooking vessel according to the present invention.

The film 14 has various designs formed thereon, and for example, as shown in FIG. 3, the film 14 has beehive (that is, hexagonal) patterns formed thereon. Particularly, as shown in FIG. 2, the film 14 is desirably formed of a black and white film having black portions 14a and transparent portions 14b. At this time, the transparent portions 14b are formed not by a solid line in the conventional practice, but by a dotted line where dots are protrudingly spaced apart from each other. If the transparent portions 14b are formed by the dotted line, the bottom surface of the cooking vessel having the beehive patterns can be provided as shown in FIG. 3.

In the state where the film 14 is applied as shown in FIG. 1C, the film 14 is irradiated with a typical ultraviolet emitter (ultraviolet rays and the like). At this time, the irradiation is desirably carried out through the ultraviolet rays of 300 lux for 5 seconds (at step d).

If the film 14 is irradiated with the ultraviolet rays, the portions of the paint layer 12 disposed underneath the transparent portions 14b are cured by means of the ultraviolet rays, and the portions of the paint layer 12 disposed underneath the black portions 14a are not cured because light is not transmitted to them. At this time, since the transparent portions 14b are formed by the dotted line where the dots are protrudingly spaced apart from each other, as shown in FIG. 2, the dots are cured, but as the space between the dots is black to cause the ultraviolet rays to be not transmitted therethrough, it is not cured.

Figure 1D:
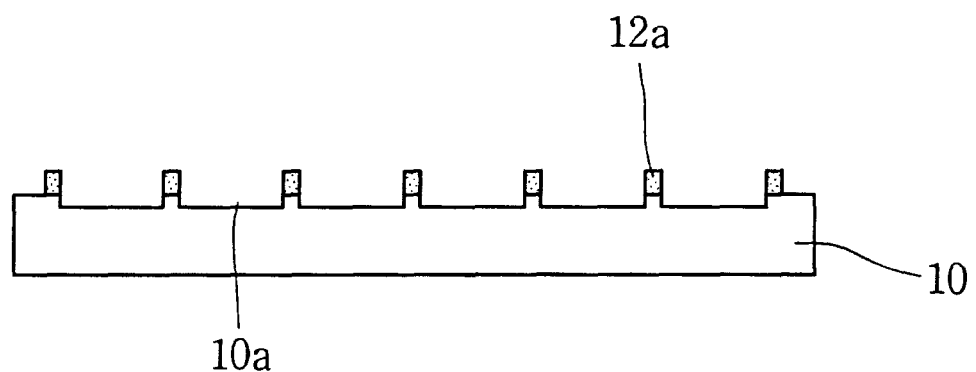

After that, the stainless steel plate 10 is immersed in a ferric oxide compound, and the portions of the paint layer 12 disposed underneath the black portions 14a of the film 14, that are not cured because the ultraviolet rays are not transmitted to them, are separated from the film 14, and consequently, a plurality of concave portions 10a are formed, and the portions of the paint layer 12 disposed underneath the transparent portions 14b of the film 14t are cured by means of the ultraviolet rays, still remain thereon, as shown in FIG. 1D (at step e).

Figure 1E:
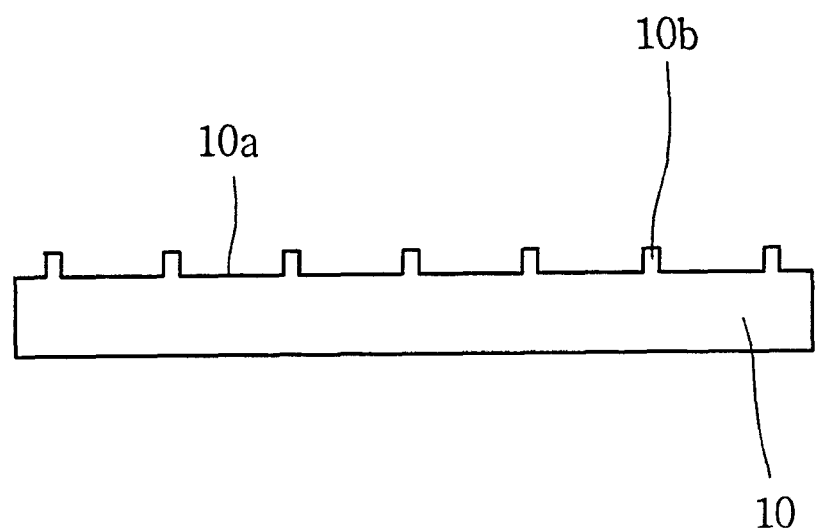
Figure 1F:
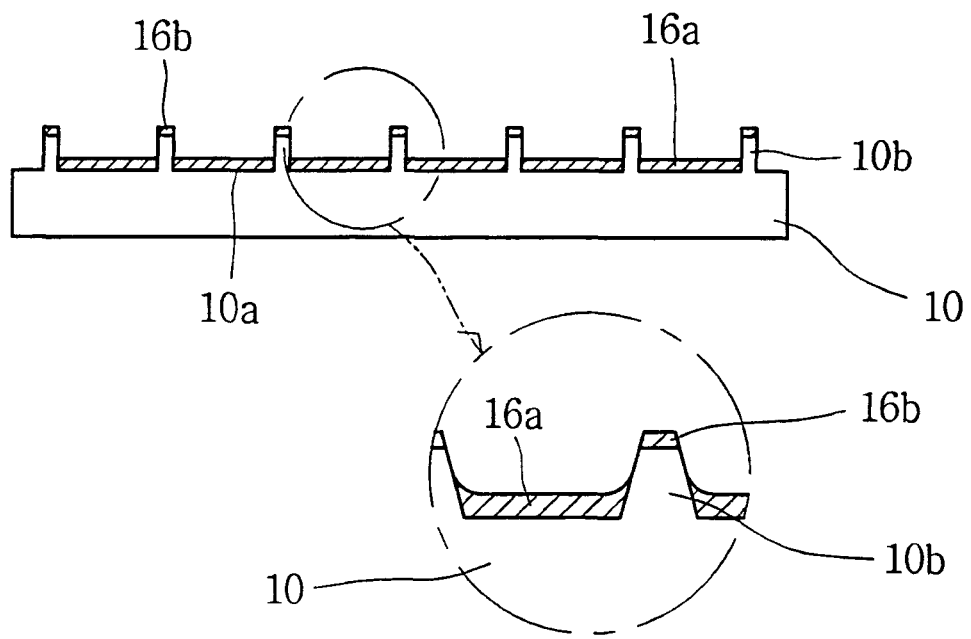

Next, if the stainless steel plate 10 is washed by water, the paint layer 12a is cleared as shown in FIG. 1E, and the concave portions 10a and convex portions 10b are formed spaced apart from each other on the stainless steel plate 10 (at step f). At this time, through the step d wherein the portions of the paint layer 12 disposed underneath the transparent portions 14b are cured by means of the irradiation of the ultraviolet rays and light is not transmitted through the space between the dots, the dots are protrudingly spaced apart from each other on the surfaces of the convex portions 10b, as shown in FIG. 3 (at step f).

Figure 1G:
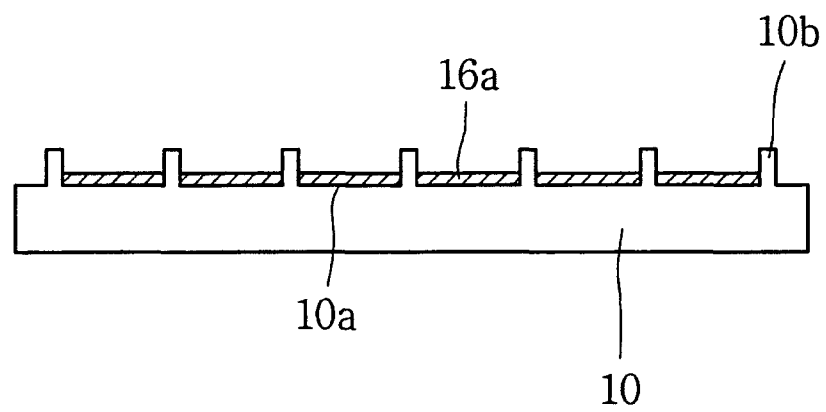

Sequentially, a typical material such as Teflon, ceramic and the like is applied to the surface of the stainless steel plate 10, that is, to the surfaces of the concave portions 10a and the convex portions 10b, thus forming coating layers 16a and 16b. Next, if the coating layer 16b is removed from the convex portions 10b, as shown in FIG. 1G, the coating layer 16a remains just on the concave portions 16a. At this time, the depth of each concave portion 16a on which the coating layer 16a is formed is desirably in the range between 0.06 mm and 0.08 mm (at step g).

Lastly, the stainless steel plate 10 is molded by means of typical press machining in such a manner as to be open on the top end thereof, while having the bottom surface and the side peripheral wall.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

According to the present invention, the cooking vessel and the method for manufacturing the same have the following advantages.

First, the photosensitive paint responding to ultraviolet rays is sprayed to the surface of the stainless steel plate, and then, after the black and white film is applied to the paint layer, the black and white film is irradiated by means of the ultraviolet emitter, thereby enhancing the degree of curing of the photosensitive paint and achieving precise patterning.

Second, the formation of the concave and convex portions on the bottom surface of the cooking vessel is not dependent upon the skill of a worker, and further, uniform and precise concave and convex patterning and reduction of the separation of the photosensitive paint during erosion are achieved, thereby decreasing the defective rate through the stability of the quality of product and reducing the manufacturing cost.

What is claimed is:

1. A method for manufacturing a non-stick cooking vessel, the method comprising the steps of: applying a photosensitive paint to a surface of a stainless steel plate to form a photosensitive paint layer; applying a film to a surface of the photosensitive paint layer, the film composed of black portions and transparent portions interspersed to create dotted patterns of the transparent portions surrounded by the black portions; irradiating the film with ultraviolet rays to only cure the photosensitive paint disposed underneath the dotted patterns of the transparent portions; removing the film, uncured portions of the photosensitive paint layer disposed underneath the black portions of the film, and a portion of the stainless steel plate disposed underneath the uncured portions of the photosensitive paint layer; followed by removing any remaining cured photosensitive paint layer to form a plurality of recessed portions in the stainless steel plate at locations underneath where the black portions of the film were prior to being removed, and to form raised portions in the dotted patterns in the stainless steel plate at locations underneath where the dotted patterns of the transparent portions of the film were prior to being removed, and thus forming a plurality of hexagonal structures on the stainless steel plate defined by a plurality of lines of dots, the dots having a diameter of 0.5 mm and comprising the raised portions; and forming a coating layer having a non-stick function only on the recessed portions of the stainless steel plate, thereby providing the non-stick cooking vessel, wherein the recessed portions have a depth of from 0.06-0.08 mm.

2. The method according to claim 1, wherein said forming the coating layer is performed by applying an initial coating layer on both the recessed portions and the raised portions of the stainless steel plate, and then removing the initial coating layer from the raised portions of the stainless steel plate.

3. The method according to claim 2, wherein the coating layer is polytetrafluoroethylene or a ceramic coating layer.

* * * * *